June 23, 1931.  E. T. FERNGREN  1,810,911
GLASS MELTING FURNACE AND PROCESS FOR PRODUCING MOLTEN GLASS
Filed March 1, 1926   4 Sheets-Sheet 1
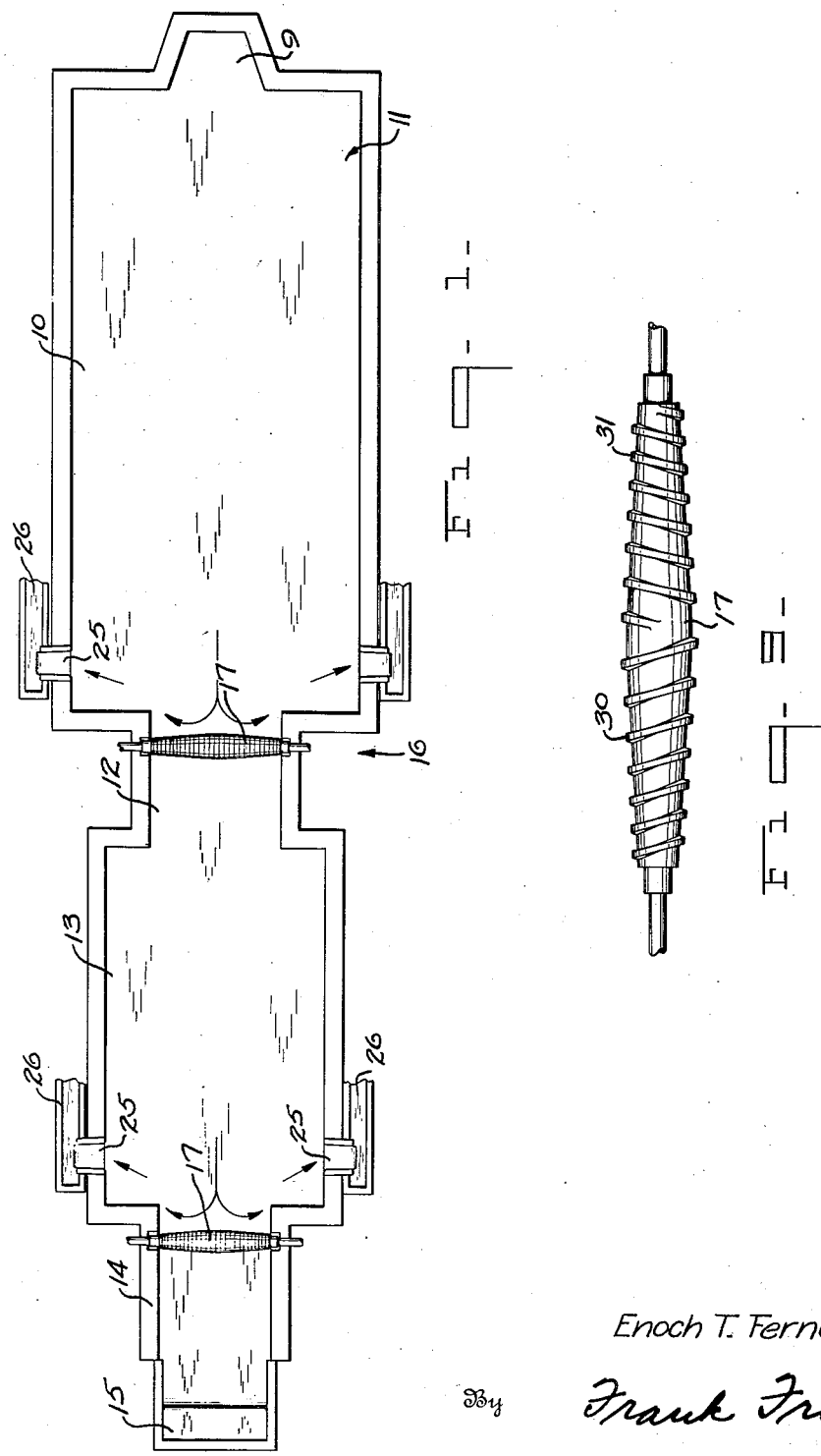
Inventor
Enoch T. Ferngren.
By  Frank Fraser
Attorney June 23, 1931. E. T. FERNGREN 1,810,911
GLASS MELTING FURNACE AND PROCESS FOR PRODUCING MOLTEN GLASS
Filed March 1, 1926 4 Sheets-Sheet 2
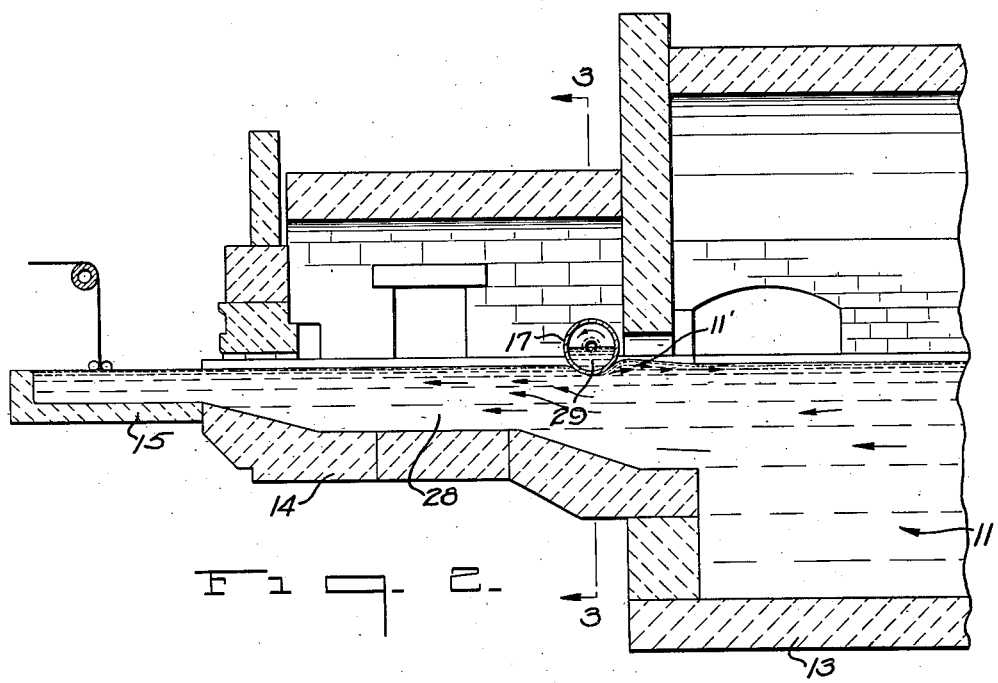
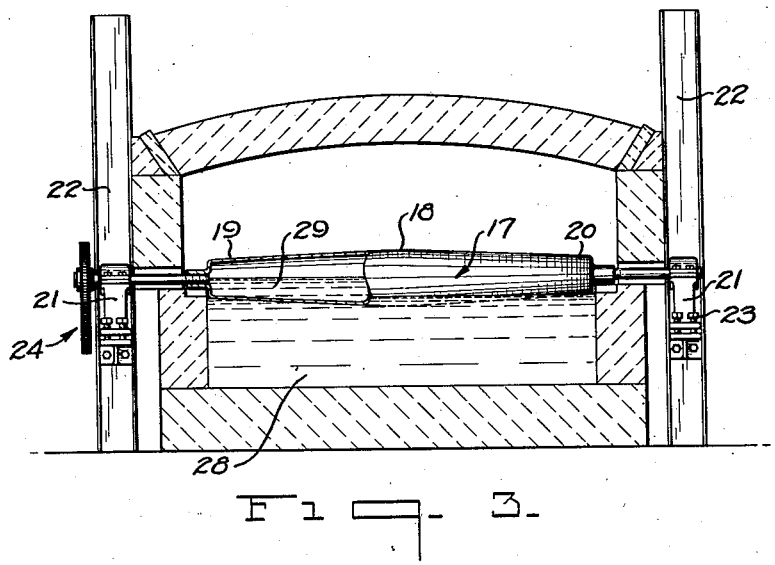
Inventor
Enoch T. Ferngren.
By Frank Fraser
Attorney June 23, 1931. E. T. FERNGREN 1,810,911
GLASS MELTING FURNACE AND PROCESS FOR PRODUCING MOLTEN GLASS
Filed March 1, 1926 4 Sheets-Sheet 3
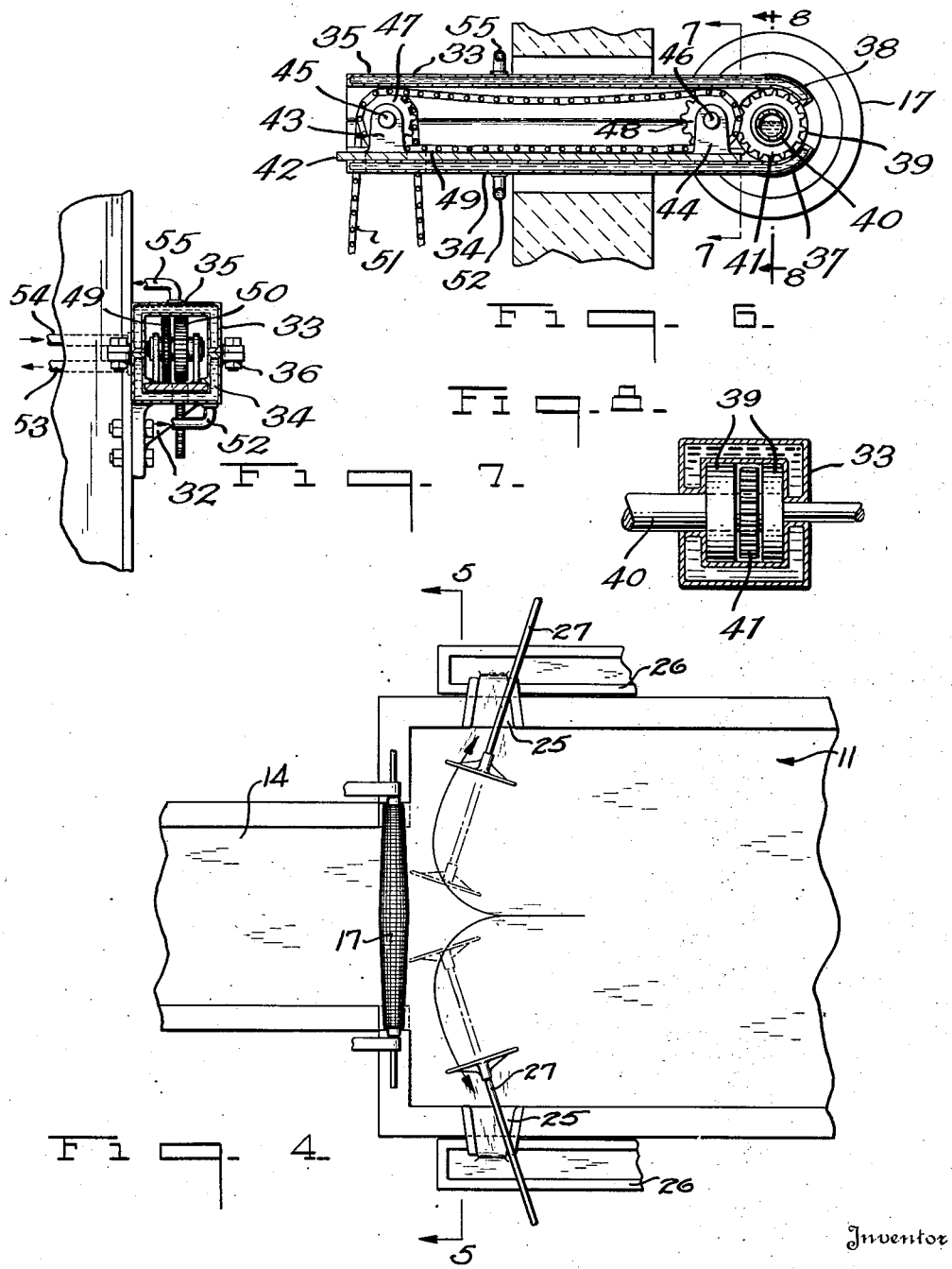
Inventor
Enoch T. Ferngren.
By Frank Fraser
Attorney June 23, 1931. E. T. FERNGREN 1,810,911
GLASS MELTING FURNACE AND PROCESS FOR PRODUCING MOLTEN GLASS
Filed March 1, 1926 4 Sheets-Sheet 4
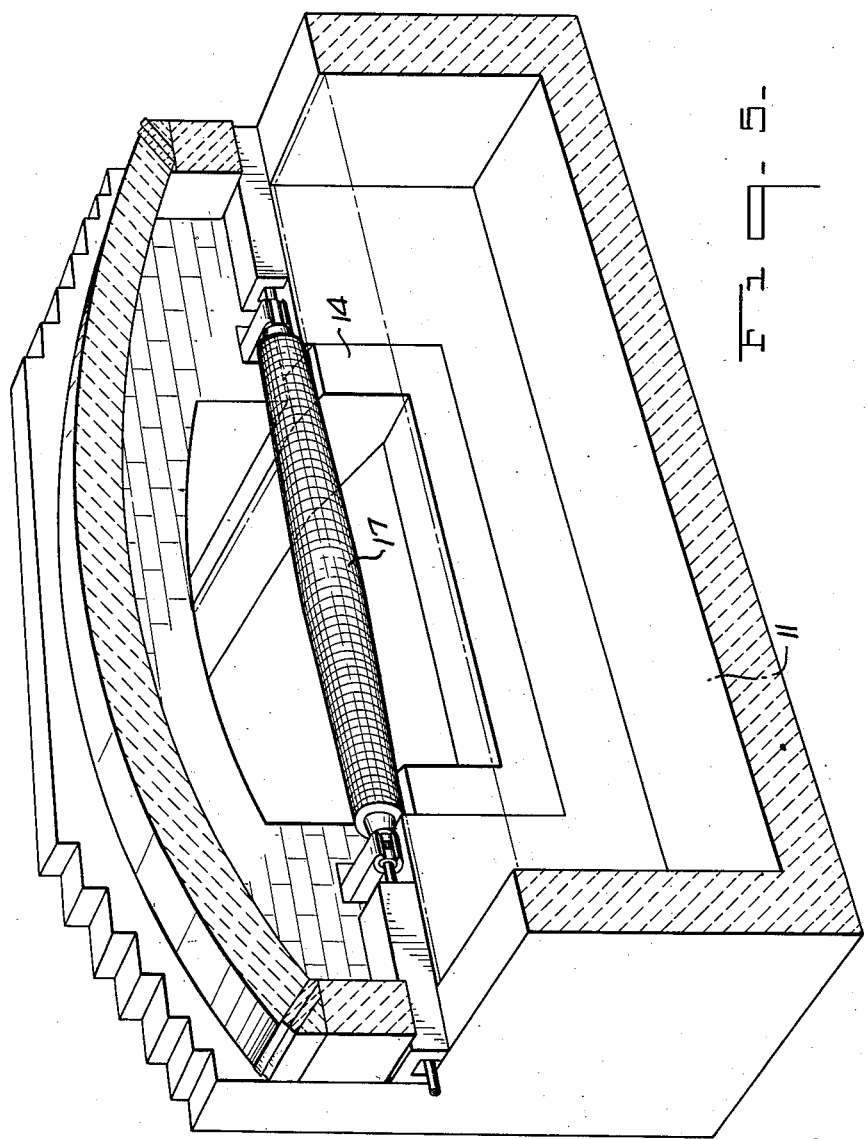
Inventor
Enoch T. Ferngren.
By Frank Fraser
Attorney Patented June 23, 1931

1,810,911

UNITED STATES PATENT OFFICE

ENOCH T. FERNGREN, OF TOLEDO, OHIO, ASSIGNOR TO LIBBEY-OWENS-FORD GLASS COMPANY, OF TOLEDO, OHIO, A CORPORATION OF OHIO

GLASS MELTING FURNACE AND PROCESS FOR PRODUCING MOLTEN GLASS

Application filed March 1, 1926. Serial No. 91,331.

The present invention relates to improvements in a glass melting furnace.

An object of the invention is to provide a tank furnace containing molten glass with means whereby foreign matter may be removed from the surface of the molten glass.

Another object of the invention is to provide a tank furnace containing molten glass with a device whereby a backward flow may be imparted to the surface of the molten glass, and causing the backward flow to creep toward the side walls of the tank furnace, and to provide means at the side walls of the tank furnace whereby the backward flowing surface glass may be removed from the tank furnace.

A further object of the invention is to provide a tank furnace with means whereby only sub-surface glass will be permitted to leave the furnace and enter a working receptacle attached to the furnace.

Further objects and advantages of the invention will become apparent during the course of the following description.

In the drawings wherein like numerals are employed to designate like parts throughout the same, Fig. 1 is a plan view of a glass melting furnace with the vault removed, showing the device at preferred locations in the furnace, Fig. 2 is a sectional elevation at the discharge end of the tank melting furnace, showing the device in sectional elevation, Fig. 3 is a transverse vertical section taken substantially on line 3—3 in Fig. 2.

Fig. 4 is a fragmental plan view of a glass melting furnace showing the device at a possible location in the furnace, Fig. 5 is a perspective view including a transverse vertical section taken substantially on line 5—5 in Fig. 4, Fig. 6 is a drive and supporting means for the device when located as shown in Fig. 4, Fig. 7 is a section taken substantially on line 7—7 in Fig. 6, Fig. 8 is a section taken substantially on line 8—8 of Fig. 6, and Fig. 9 is a modified form of the device covered by the present invention.

Referring to the drawings in detail, the numeral 9 refers to a doghouse, in which raw glass making materials may be fed and permitted to pass into a melting chamber 10, where they are reduced to a molten mass of glass 11, which passes through a neck 12 into a refining chamber 13, and then to a cooling chamber 14, and thence into a working receptacle 15 from where it may be suitably formed into commercial articles. The doghouse and the various mentioned chambers, when suitably covered and arranged, form a continuous glass melting tank furnace 16.

During the process of reducing the glass making materials to a molten mass of glass, and flowing the molten glass through its respective chambers to the working receptacle 15, there collects upon the surface of this molten mass, scum or foreign matter. Unless this foreign matter is removed from the surface of the molten glass it proves detrimental when it works its way up into the working receptacle and thence into the commercial articles produced therefrom. It is the object of the present invention to remove this objectionable foreign matter floating upon the molten glass, and is preferably done by skimming off the upper surface 11' of the molten glass by employing the use of rotatable members 17 suitably located within the furnace 16.

As shown in Fig. 1, two such members or rolls may be employed, one in the neck 12 and the other in the cooling chamber 14. These rolls 17 are largest in diameter at the center 18, the diameter thereof gradually decreasing from the center equally toward both ends 19 and 20. They are supported in suitable bearings 21, attached to the furnace structure 22, and are adapted to be raised and lowered by the jack screws 23 in the bearings 21. The rolls are preferably driven by means of a sprocket and chain drive 24, and when in operation, are submerged into the glass at a suitable depth, being preferably rotated in the direction indicated by the arrow in Fig. 2, in the opposite direction to the normal flow of the molten glass in the tank, thus creating a backward flow upon the surface of the molten glass. The roll gradually decreasing in diameter from its center toward both ends, causes the resulting roll surface to have correspondingly decreasing circumferential velocities, which will have a tendency to cause this backward flow of glass to creep from the center of the tank furnace toward both sides thereof, as indicated by the arrows in Fig. 1. This glass accumulating along the side walls of the furnace may be continuously or intermittently removed from the furnace in either of two ways—by permitting the glass to flow continuously through the openings 25 in the side walls of the furnace, into suitable water filled receptacles 26, where it immediately hardens and may be removed therefrom for further use, or by employing the use of skimming tools 27, as shown in Fig. 4.

Another advantage in skimming the surface of the molten glass 11', in accordance with the present invention, is that only subsurface glass 28 is permitted to flow into the working receptacle, which is considered a much better quality of glass than exposed surface glass.

In order to prevent the molten glass from sticking to the roll 17, a cooling medium 29 may be circulated therethrough. The surface of the roll is preferably slightly roughened in order to create a greater tractive force upon the surface of the molten glass.

In order to increase the flow of glass toward the side walls of the tank furnace, the surface of the roll may be spiraled as shown in Fig. 9, that is one half of the roll may be provided with right hand spirals 30, while the other half of the roll may be provided with left hand spirals 31, thus creating, when rotated, a positive sidewise and backward flow to the surface glass 11' toward the side walls of the furnace.

In Figs. 6, 7 and 8, there is disclosed one type of means which may be employed for supporting and driving the skimming roll 17, and it is desirable that such means be cooled in a manner to prevent overheating thereof. To this end, there is supported by one or more brackets 32 carried at each side of the furnace 16 an internally cooled horizontally elongated casing or housing 33 substantially square in cross section. The housing 33 is composed of a lower substantially U-shaped section 34 and an upper inverted substantially U-shaped section 35, said upper and lower sections being bolted or otherwise suitably secured together by means 36. The lower and upper sections 34 and 35 are arcuately curved toward one another at one end as indicated at 37 and 38 respectively and between these curved portions are positioned the spaced bearings 39 within which the corresponding end of shaft 40 of roll 17 is journaled. Mounted upon shaft 40 between bearings 39 is a gear 41. Arranged within housing 33 and supported upon the lower section 34 thereof is a plate or base 42 carrying pairs of spaced bearings 43 and 44 within which are journaled pins 45 and 46 respectively carrying gears 47 and 48 about which is trained a sprocket chain 49. Also keyed upon pin 46 is a gear 50 meshing with gear 41, while keyed to pin 45 is a second sprocket (not shown) about which is trained a sprocket chain 51 associated with a suitable driving mechanism. The upper and lower sections of housing 33 are each provided with inner and outer spaced walls forming a compartment therebetween through which a suitable cooling medium such as water or the like is adapted to be passed. This cooling medium is adapted to enter the lower section 34 through pipe 52 and to pass therefrom through pipe 53, while the cooling medium is adapted to enter the upper section 35 through pipe 54 and to pass therefrom through pipe 55. Due to the cooling of the housing 33, the supporting and driving means for the skimming roll will be cooled in such a manner as to prevent overheating thereof.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In a tank furnace containing molten glass, a rotatable roll having its greatest diameter at its center portion, said roll lying substantially upon the surface of the molten glass.

2. In a tank furnace containing molten glass, a rotatable roll having different diameters at the ends than at the center for skimming the surface of said molten glass.

3. In a tank furnace containing molten glass, a roll whose surface tapers an equal amount from the center thereof towards both ends, and means for rotating the roll substantially upon the surface of said molten glass.

4. In a tank furnace containing molten glass, a rotatable member, means for cooling said member, means for raising and lowering the member relative to the molten glass, means preventing the member from drifting longitudinally of the furnace, means for rotating the member to impart a backward flow movement upon the surface of said molten glass, the surface of said member being so shaped to cause the backward moving surface glass to creep towards the side walls of said furnace, and means for removing the backward moving glass from said tank furnace.

5. In a tank furnace containing a molten mass of glass, a roll whose diameter gradually decreases from its center equally toward both ends, right hand spirals on the surface of one half of said roll, and left hand spirals on the surface of the other half thereof.

6. Means for skimming the surface of a mass of molten glass contained in a continuous glass melting furnace, comprising a member, being larger through its center portion than at its end portions, lying in and across the surface of said molten glass, means for rotating the member to cause a backward and outward movement to said surface of the molten glass, and means for removing said backward and outwardly moving glass from the furnace.

7. In a tank furnace containing a continuously flowing mass of molten glass, a cooled rotatable member lying transversely across the path of the molten glass for creating a counter flow to the surface thereof toward both sides of the tank furnace, and means for removing said surface glass.

8. In a tank furnace containing a flowing mass of molten glass, a member for imparting a sidewise counter flow upon the surface of the molten glass, means for cooling the member, means for supporting the member, means for cooling said supporting means, and means within the supporting means for driving the member.

9. In an apparatus for producing articles of glass from a mass of molten glass, a rotatable member arranged partially therein for creating a movement of the surface glass towards the sides of said mass, and means for removing said surface glass from said mass.

10. In a tank furnace containing molten glass, a member arranged partially therein, the central portion of said member displacing more molten glass than its end portions, and means for rotating the member, causing a reversed sidewise flow to the surface of said molten glass.

11. A tank furnace in which molten glass is produced, a working receptacle adapted to receive molten glass from the furnace, a rotatable member in the furnace, contacting with the molten glass, whcih imparts a sidewise counter flow to the surface of the molten glass toward the side walls of said furnace, thus permitting only sub-surface glass to flow to said receptacle, and means for removing the side-tracked surface glass from the furnace.

12. The process of skimming a contained mass of molten glass, consisting in reversing the flow of the surface of the molten glass, and then removing said surface glass from the molten mass.

13. The process of skimming a contained mass of molten glass, consisting in reversing the flow of a portion of the surface of the molten glass, causing this portion of molten glass to creep outwardly from the center of the contained mass of molten glass, and removing the backward outwardly creeping portion of molten glass.

14. The process of supplying a working receptacle with molten glass from which glass articles are formed, consisting in producing a mass of molten glass, creating a backward and sideward movement to the surface glass of said mass toward the sides thereof, and removing said surface glass from said mass.

15. In a tank furnace containing molten glass, a rotatable skimming member mounted transversely thereof and having a portion above the molten glass and a portion disposed beneath the surface thereof, the central portion of said member displacing more glass than the ends of said member, the central portion of the member extending further out of the glass than the ends thereof.

16. In a tank furnace containing molten glass, a rotatable skimming member lying in and extending across the path of the molten glass, a portion of said member being arranged above the surface of the molten glass while the remainder of said member is disposed beneath the surface of said molten glass, the surface of the member tapering from its maximum central outside dimension toward both ends thereof the same amount, the central portion of the member displacing more glass than the ends thereof.

17. In a tank furnace containing molten glass, a rotatable skimming member in contact with the molten glass, the central portion of said member displacing more glass than its ends.

18. In a tank furnace containing molten glass, a rotatable skimming member lying in and extending across the path of the molten glass, the surface of said member tapering from its maximum central outside dimension toward both ends thereof the same amount.

Signed at Toledo, in the county of Lucas and State of Ohio, this 25th day of February, 1926.

ENOCH T. FERNGREN.